(12) United States Patent
Kalinowski

(10) Patent No.: US 6,814,565 B2
(45) Date of Patent: Nov. 9, 2004

(54) SUPPORT FIXTURE FOR THERMAL CURING PROCESSES

(75) Inventor: Paul W. Kalinowski, Boylston, MA (US)

(73) Assignee: Saint-Cobain Abrasives Technology Company, Worcester, MA (US)

(*) Notice: Subject to any disclaimer, the term of this patent is extended or adjusted under 35 U.S.C. 154(b) by 143 days.

(21) Appl. No.: 10/612,113

(22) Filed: Jul. 2, 2003

(65) Prior Publication Data

US 2004/0096537 A1 May 20, 2004

Related U.S. Application Data

(62) Division of application No. 08/994,236, filed on Dec. 19, 1997, now abandoned.

(51) Int. Cl.$^7$ ............................. B29C 33/38; B29C 35/02
(52) U.S. Cl. ....................... 425/403; 425/383; 425/446; 264/109; 264/112; 264/236; 264/313; 264/319; 264/347; 269/47; 269/48.1
(58) Field of Search ............................... 425/446, 383, 425/403; 264/109, 112, 236, 313, 319, 347; 269/47, 48.1

(56) References Cited

U.S. PATENT DOCUMENTS

| | | | |
|---|---|---|---|
| 2,449,407 A | 9/1948 | Mulholland ....................... 18/5 |
| 3,372,220 A * | 3/1968 | Stingley ....................... 264/236 |
| 3,593,380 A | 7/1971 | Voronov et al. ............. 18/34 R |
| 3,618,179 A | 11/1971 | Anderson et al. ............... 25/27 |
| 3,643,911 A * | 2/1972 | Reid ........................... 249/170 |
| 3,824,051 A | 7/1974 | Van Loemput ............... 425/78 |
| 3,844,523 A * | 10/1974 | Wilheim ..................... 425/113 |
| 3,868,793 A * | 3/1975 | Corcoran et al. ........... 451/548 |
| 3,989,790 A | 11/1976 | Bruner et al. ............... 264/225 |
| 4,533,311 A | 8/1985 | von Karchowski ......... 425/405 |
| 4,588,420 A * | 5/1986 | Charvat ....................... 51/298 |
| 4,812,115 A | 3/1989 | Kemp ..................... 425/405.2 |
| 4,889,677 A | 12/1989 | Hashimoto et al. ...... 264/297.5 |
| 5,033,939 A * | 7/1991 | Brasel ........................... 419/37 |
| 5,275,547 A | 1/1994 | Brown ..................... 425/129.1 |
| 5,491,869 A * | 2/1996 | Sullivan et al. ............... 15/245 |
| 5,645,783 A | 7/1997 | Ansari et al. ............... 264/112 |
| 5,779,528 A * | 7/1998 | Tartaglione ................. 451/358 |

* cited by examiner

Primary Examiner—Michael Colaianni
Assistant Examiner—Michael I. Poe
(74) Attorney, Agent, or Firm—Mary E. Porter

(57) ABSTRACT

A flexible or semi-rigid support fixture is sized and shaped to supportably engage a surface of a polymeric matrix object such as an organic bonded abrasive grinding wheel. The support fixture is utilized to support the object to help prevent slumping and/or expansion during thermal curing operations. The fixture is fabricated from a material, such as silicone rubber, that is capable of withstanding heat commonly associated with thermal curing operations and which provides sufficient resilience to permit use with objects manufactured within a relatively wide range of dimensional tolerances. Suitable materials include silicone rubber or other polymers or copolymers such as PTFE, FEP, Polyimide or blends with or without fillers or substrates.

4 Claims, 4 Drawing Sheets

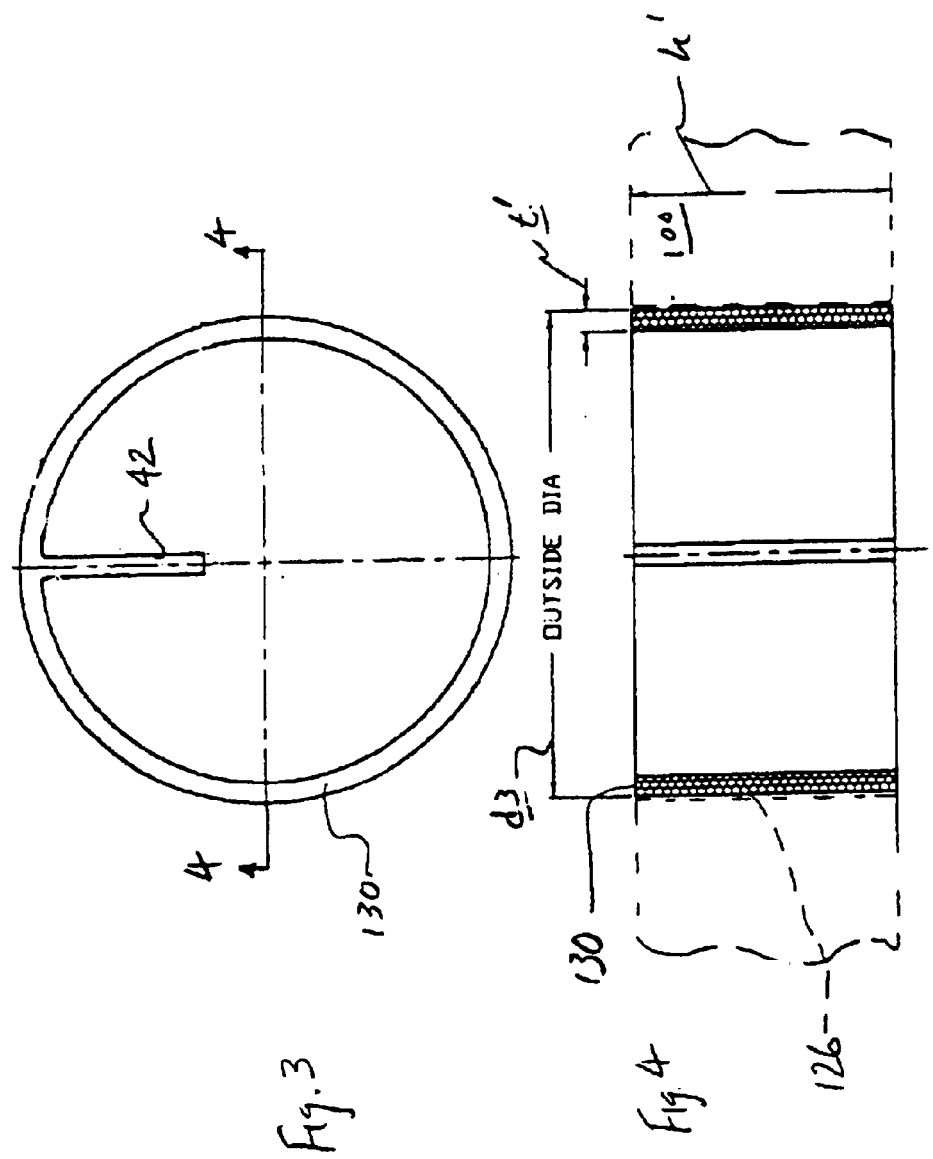

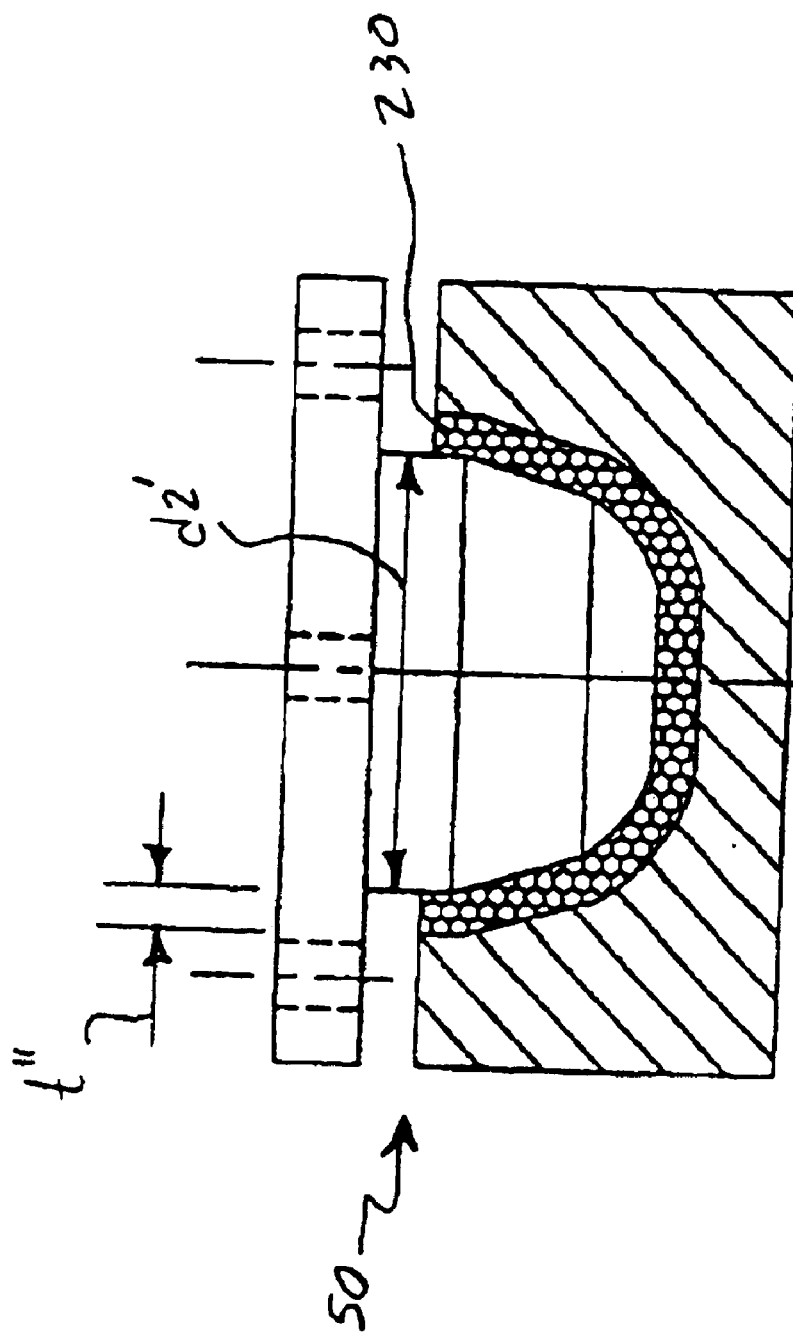

SUPPORT FIXTURE FOR THERMAL CURING PROCESSES

This application is a divisional application having priority in U.S. Ser. No. 08/994,236, filed Dec. 19, 1997 now abandoned.

BACKGROUND OF THE INVENTION

1. Field of the Invention

This invention relates to grinding wheels, and more particularly to a flexible, reusable support fixture for maintaining the green shape of organic bonded abrasive wheels during heat curing processes.

2. Background Information

The grinding wheel art is highly developed and includes a wide range of wheel constructions and wheel fabrication processes adapted to optimize specific grinding operations and/or applications. Abrasive grinding wheels have long been used in the metal working industry to cut and abrade metal. For example, "rough grinding" wheels are typically used for conditioning operations in which surface defects such as cracks, folds, scale, scabs, seams, cinder patches and burned steel are removed from ingots, blooms, billets and slabs of metal prior to further processing.

The American National Standards Institute (ANSI) has classified various grinding wheel configurations. Examples of these classifications include straight or disc shaped wheels (Type 1), cylinder wheels (Type 2), straight cup (Type 6), flaring cup (Type 11), cone (Type 17) and plug (Type 18), etc.

Grinding wheels are fabricated from abrasive particulates or grains, such as aluminum oxide, silicon carbide, or combinations thereof, of various hardnesses, maintained in a three-dimensional bond matrix. Vitrified bonds are commonly used in precision grinding applications, while organic bonds, such as those provided by phenolic resin, epoxy resin, rubber, shellac or other resin bond material are commonly used in rough grinding applications. These conventional bonded abrasive grinding wheels are commercially available from Norton Company of Worcester, Mass.

Organic bonded abrasive grinding wheels are typically fabricated by conventional hot or cold pressed molding techniques in which a composition or mix of the abrasive and bond material is placed in a mold under pressure to form an uncured or "green" grinding wheel of predetermined density. This green wheel typically contains a specific amount of air or porosity in addition to the normal abrasive and bond constituents. The green wheel is generally removed from the mold for thermal curing operations. In many cases, especially where the bond or porosity is a high percentage of the grinding wheel, it is necessary to support the periphery both at the peripheral circumference and the circumference of the mounting hole to prevent distortion (slumping or expansive growth) generated by melting of the resin during application of heat in the curing process.

Conventional methods of supporting green wheels include wrapping the wheels in paper and taping and/or inserting the wheel into a bed of sand or similar granular material. These methods are disadvantageously labor intensive and may be environmentally unfriendly due to generation of dust and/or disposal of the paper after removal from the wheel.

Several attempts have been made to eliminate the need for paper or sand beds during curing operations. One approach has been to provide reusable rigid metallic bodies to support the green wheels during curing. This approach, however, has been largely unsuccessful for a variety of reasons, including cost, deformation of the bodies during handling, and dimensional non-compliance. The dimensional non-compliance or improper fit is generated by manufacturing tolerances of both the metallic bodies and green wheels. Such non-compliance is also generated in large part by mold wear, as repeated contact with the abrasive composition tends to wear the mold over time. The green dimensions of the wheel tend to vary according to the degree of tooling wear.

Other approaches have been to cure the green wheel in the mold, rather than remove the wheel prior to cure. Examples of molds generally devised for this purpose are disclosed in U.S. Pat. Nos. 5,275,547 and 2,449,407. A significant drawback of this in-mold curing approach, however, is related to the relatively long cure times, i.e. 12–36 hours, associated with thermally curing grinding wheels, and the relative expense of wheel molds in general. In particular, after the green wheel is formed, the mold remains unavailable for fabricating additional wheels until the thermal curing operation is complete. This lowers the throughput of each mold which tends to increase the effective manufacturing costs of each wheel.

In an attempt to combine the advantages of in-mold and out-of-mold curing, one approach has been to provide rigid mold liners within which the green wheel is molded. The liner and the green wheel disposed therein, are removable from the mold as a unit for curing. An example of this concept is generally disclosed in U.S. Pat. No. 5,645,783. Drawbacks of this approach include increased mold complexity and cost, dimensional variations due to wear between the mold and liner, and deformation of the liner during handling.

Thus, a need exists for an improved support fixture and method for curing grinding wheels and other, similar composites comprising a thermoset polymeric matrix.

SUMMARY OF THE INVENTION

According to a first aspect of this invention, a fixture for use in thermally curing an object fabricated from a polymeric matrix, includes a wall portion of predetermined size and shape adapted for supportive engagement with a surface of the object. The wall portion is adapted to maintain the supportive engagement during exposure to a predetermined range of temperatures utilized for thermal curing and is fabricated from a polymeric material that is elastically deformable to facilitate the supportive engagement.

The present invention provides, in a second aspect, a method of forming an object from a polymeric matrix, including the steps of molding the object and providing a support sized and shaped to engage a surface of the object, the support being fabricated from a material that exhibits substantial resilience and resistance to thermal curing temperatures. Subsequent steps include engaging the support with the surface of the object, thermally curing the object, and removing the object from the support.

The above and other features and advantages of this invention will be more readily apparent from a reading of the following detailed description of various aspects of the invention taken in conjunction with the accompanying drawings.

BRIEF DESCRIPTION OF THE DRAWINGS

FIG. 3 is a plan view of an alternate embodiment of a support fixture of the present invention;

FIG. 4 is a cross-sectional view taken along 4—4 of FIG. 3 of the support fixture in operative engagement with a portion of a grinding wheel shown in phantom; and FIG. 5 is a cross-sectional elevational view of a further embodiment of a support fixture of the present invention, during a step in the fabrication thereof.

DETAILED DESCRIPTION OF THE PREFERRED EMBODIMENTS

Figure 1:
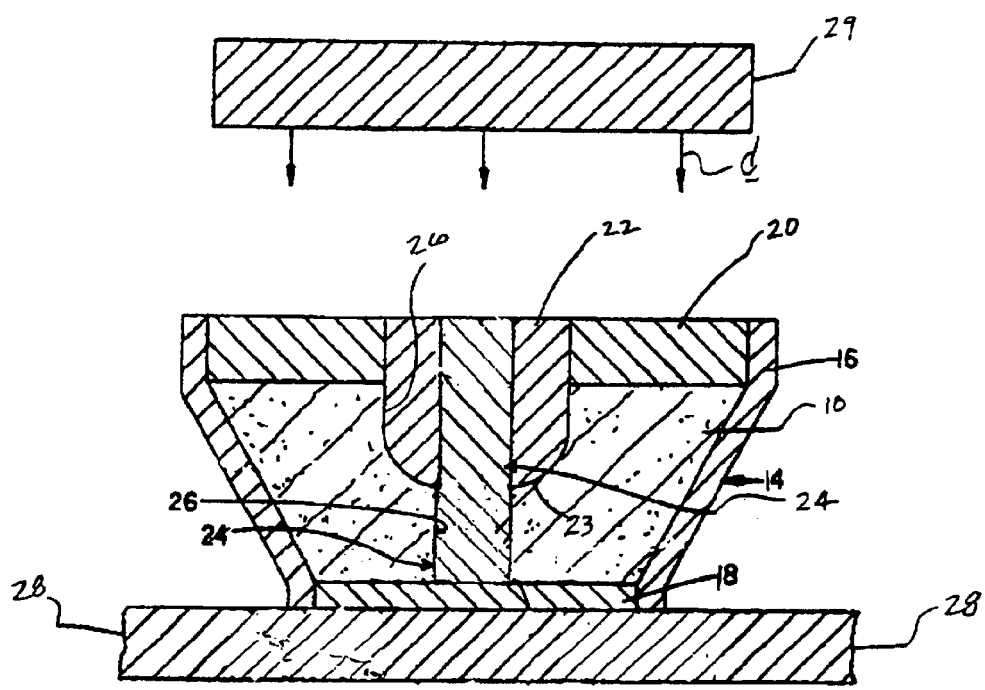
FIG. 1 is a cross-sectional elevational view of a grinding wheel of the prior art, during a step in the fabrication thereof, with which the present invention may be used.

Referring to the figures set forth in the accompanying Drawings, illustrative embodiments of the present invention will be described in detail hereinbelow. For clarity of exposition, like features shown in the accompanying Drawings shall be indicated with like reference numerals and similar features as shown in alternate embodiments in the Drawings shall be indicated with similar reference numerals.

The present invention includes a flexible or semi-rigid support fixture sized and shaped to supportably engage a surface of a polymeric matrix object such as an organic bonded abrasive grinding wheel. The fixture is utilized to support the object to help prevent slumping and/or expansion during thermal curing operations. The fixture is fabricated from a material, such as silicone rubber, that is capable of withstanding heat commonly associated with thermal curing operations and which provides sufficient resilience to permit use with objects manufactured within a relatively wide range of dimensional tolerances. Suitable materials include silicone rubber or other polymers or copolymers such as PTFE, FEP, Polyimide or blends with or without fillers or substrates.

Where used in this disclosure, the term "mechanically neutral support" or "neutral support" is herein defined as mechanical support within a range sufficient to substantially prevent slumping, expansion, etc. of an object during thermal curing, substantially without altering or deforming the shape of the object (i.e. by compression or expansion).

Referring now to the drawings in detail, as shown in FIG. 1, a flaring cup (Type 11) wheel 10 is formed within a conventional mold 14 that includes a frusto-conical shell 16 and parallel closure plates 18 and 20. A nub 22, of generally cylindrical shape, or shaped as a frustum with a rounded or faired end 23, is disposed concentrically with an axially extending center pin 24 in plate 20. Nub 22 and pin 24 define a central recess or hole 26 within grinding wheel 10.

As shown, mold 14 is disposed between a planar base or support 28 and a press 29. Press 29 is adapted for compressive movement in a direction d towards base 28. This movement brings the press into engagement with plate 20 and pushes plate 20 into shell 16 to a fully compressed position as shown. This movement applies a predetermined compressive force to mold 14 which, alone, or in combination with application of a predetermined level of heat, serves to form a "green" or uncured wheel 10. It should be apparent to one skilled in the art that the geometry of individual components of mold 14 may be varied to produce wheels of substantially any desired configuration, such as the ANSI wheel types discussed herein.

Figure 2:
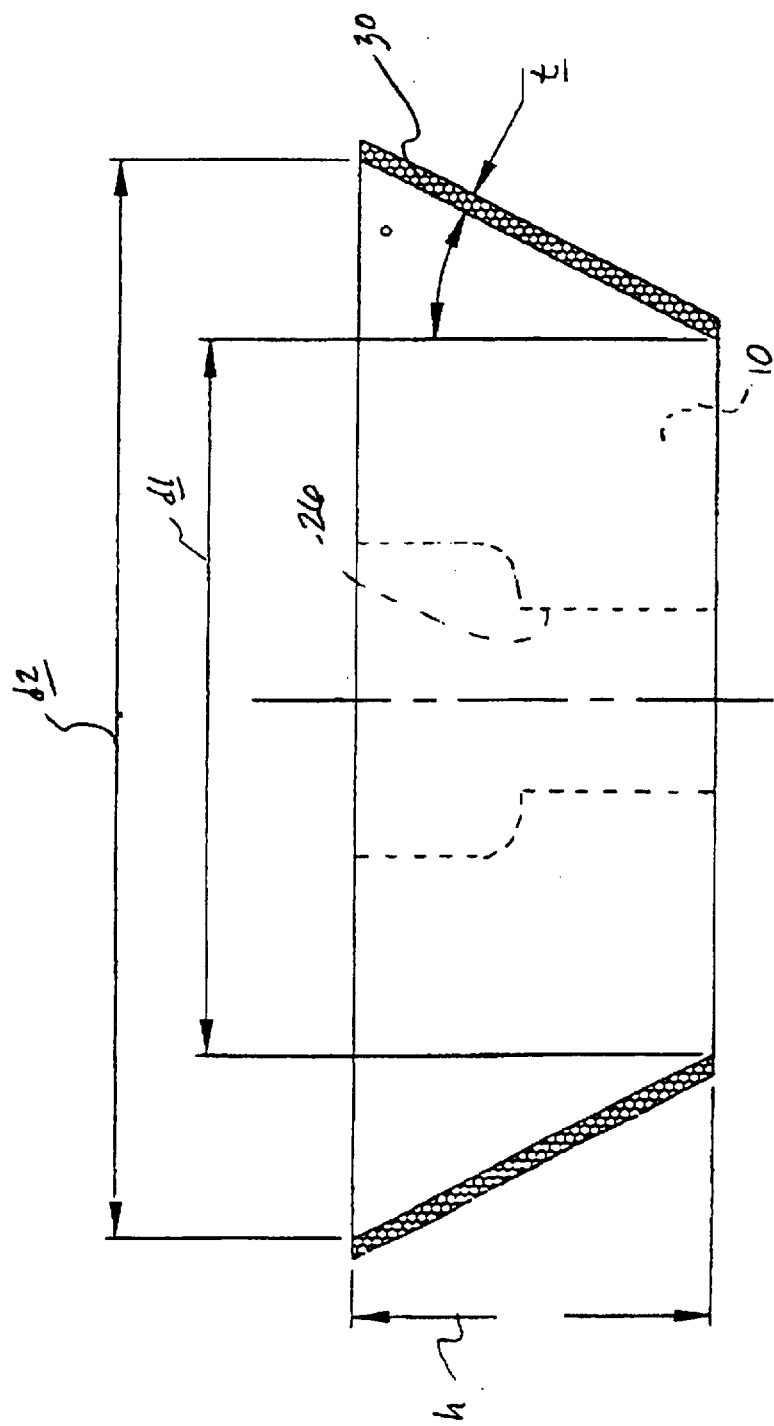
FIG. 2 is a cross-sectional elevational view of an embodiment of a support fixture of the present invention adapted for use with the grinding wheel of FIG. 1.

Turning now to FIG. 2, in one embodiment of the present invention, a support 30 is engaged with the periphery of green wheel 10. Support 30 is provided with predetermined geometry, dimensions and resiliency to facilitate this engagement, while providing substantially mechanically neutral support to the wheel during thermal curing operations.

The dimensions of support 30, including diameters d1 and d2, and thickness t, are predetermined to provide a fit within the range of a sliding fit to an interference fit relative to the nominal dimensions of a green wheel 10 of a particular size designation. Support 30 is provided with a durometer hardness within a range of approximately 25–90 (Shore A) and preferably within a range of 25–60. Durometer hardness measurements generally correlate to the elastic modulus or resiliency of rubber compounds under conditions of relatively small strain. Since the present invention is utilized under relatively low levels of strain, i.e. nominally less than a 50 percent change in length, the durometer hardness generally correlates to the elastic modulus of a material used in the present invention, as will be discussed in greater detail hereinbelow.

A durometer hardness within this range, in combination with thickness t and the aforementioned sliding or interference fit, enables support 30 to apply neutral support to the wheel. Moreover, the fixture may be elastically deformed (in this instance tensioned or stretched), to a predetermined extent to facilitate installation and use on wheels 10 having dimensions which may exceed the nominal wheel dimensions for a designated wheel size. Such dimensional variations may be generated by manufacturing tolerances, mold wear, etc. Thus, although support 30 is preferably sized for a sliding or interference fit with a green wheel 10, the dimensions and elastomeric material of the support enable it to be elastically deformed or stretched to facilitate installation. These characteristics also enable the support to be disposed in tension when installed for use with a wheel of greater than nominal dimensions, without applying a force that exceeds the aforementioned neutral support range or threshold. In this regard, it has been shown that the fixture should supportably engage the wheel without exceeding the neutral support pressure as thermal curing temperatures pass through a "critical zone" of approximately 110–130° C.

Such neutral support pressure or threshold varies with the size, shape and composition of the green wheel. However, examples of pressure levels within this neutral support range, namely, pressures which may be applied to the wheel periphery during curing without deforming the surface thereof, include approximately 200,000 $N/m^2$ for 25 cm diameter Type 1 wheels, and 100,000 $N/m^2$ for 15 cm diameter Type 11 wheels.

As shown, support 30 is frusto-conical in shape to enable surface to surface engagement with the periphery of a Type 11 wheel. Wall thickness t is predetermined to provide the aforementioned neutral support to the wheel during thermal curing, while enabling the support to be elastically deformed as discussed hereinabove. Thickness t is determined based upon the dimensions of the green wheel to be supported. It has been found that in general, thickness t is preferably large enough that the fixture is self supporting, i.e. that it does not collapse under its own weight prior to engagement with the green wheel. This minimum thickness has been shown to provide adequate support to the wheel while facilitating installation on the wheel. Thickness t may be larger than this minimal "self-supporting" thickness. The skilled artisan will, however recognize that increasing thickness t will tend to increase the force required to elastically deform the fixture. Increasing thickness t thus tends to decrease the range of wheel sizes with which the support may be used without exceeding the neutral support pressure.

Referring now to FIGS. 3 & 4, an alternate embodiment of the present invention, shown as support 130, is in many respects similar or identical to support 30, though being adapted to engage an inner surface, rather than an external periphery of a green wheel. Support 130 is substantially cylindrical and as shown in FIG. 4, is adapted to engage a cylindrical central recess or hole 126 of a typical green wheel 100 (shown in phantom). Wheel 100 may be of substantially any configuration, such as, for example, a straight wheel (Type 1), cylinder wheel (Type 2), straight cup (Type 6), or flaring cup (Type 11 as shown in FIGS. 1 & 2). Although shown as being substantially cylindrical for engagement with a cylindrical hole 126, support 130 may be provided with a shape adapted to engage holes or hole portions of various non-cylindrical geometries, such as hole 26 of wheel 10 (FIGS. 1 & 2).

Support 130 preferably includes a flange 42 that extends radially inward from the periphery thereof. The flange serves as a handle to facilitate installation of support 130 into and out of hole 126. Dimensions of support 130 are predetermined substantially as discussed hereinabove with respect to support 30. In particular, support 130 is sized and shaped to interfit with wheel 100 in a manner ranging from a sliding fit to an interference fit. Support 130 may be fabricated as an annular cylinder with a predetermined, self supporting, wall thickness t', or alternatively, the support may be fabricated as a solid plug (not shown).

Turning to FIG. 5, an additional embodiment of the present invention is shown as support 230. This support is in many respects similar or identical to the previously described embodiments. Differences between this embodiment and the aforementioned embodiments include use of a generally concave, rather than annular configuration. This shape enables support 230 to engage the peripheral surface of wheels that do not utilize through bores or holes, such as cone and plug type wheels. Examples of cone and plug type wheels include ANSI Types 16, 17, 17R, 18, 18R, 19 and 19R wheels (not shown). Support 230 is preferably fabricated in a mold 50 sized and shaped to enable the support to receivably engage the peripheral surface of a wheel (not shown), with a fit ranging from sliding to interference, to provide substantially neutral support thereto. In the particular embodiment shown, support 230 is sized and shaped for use with a rounded plug (Type 18R) wheel.

The present invention may be fabricated from a variety of heat resistant polymeric materials capable of withstanding temperatures common to thermal curing. In particular, the materials should maintain their mechanical properties over a range of approximately 60–300° C., preferably, 100–250° C., most preferably 150–200° C.

Surprisingly, it has been found that materials preferred for use in the present invention are those that tend to be unsuitable for integral use within a mold. In particular, polymeric or rubber components integral to a mold, such as, for example, a mold liner or bladder, must generally exhibit substantial abrasion and tear resistance to avoid damage from contact with the abrasive wheel mixture as it is fed and compressed into the mold. It has been found that the present invention operates successfully with materials such as silicone rubber, that exhibit particularly low abrasive and tear resistance. These surprising results are apparently due in part, to the relatively low, mechanically neutral pressure applied by the fixture to the wheel. This feature, in combination with the relatively high resiliency as indicated by durometer hardness, facilitates engagement of the fixture with the green wheel with relatively low frictional or abrasive contact therebetween.

Examples of suitable materials include silicone rubber or other polymers or copolymers including fluorinated polymers such as polytetrafluoroethylene (PTFE) and fluorinated ethylene propylene (FEP), polyimide, acrylates, ethylene-propylene terpolymer (EPDM), butyl rubber (IIR), chlorosulfonated polyethylene, neoprene, nitrile rubbers (NBRs) or blends thereof with or without fillers or substrates. Examples of fillers suitable for use include, for example, iron oxide, calcium carbonate, glass spheres or fibers and wollastonite.

Silicone rubber is preferred due to its resistance to heat, its flexibility, resilience and moldability to a wide range of geometries at relatively low cost. An example of a suitable silicone rubber is known as "Dow Corning 734 Flowable RTV Silicone" available from Dow Corning, Inc. of Midland, Mich.

The support of the present invention may be fabricated in any conventional manner. For example, the rubber compound may be molded in its unvulcanized state, such as by compression, transfer, injection molding, etc. into predetermined dimensions. The support 30, 130 or 230 may be subsequently cured (vulcanized) in the mold, or may be cured upon removal from the mold by steam, hydraulic (water) or air curing, or by alternate methods such as LCM (liquid curing medium), ultrahigh frequency (uhf) or microwave energy curing.

Alternatively, the supports may be fabricated from preformed sheet stock cut and seamed to provide the desired geometry. In this regard, however, seams should be fabricated to have similar structural and thermal characteristics as unseamed portions of the support.

The skilled artisan will recognize that the geometric design of the support must be sufficient to compensate for variations in the material chosen as well as the method of fabrication. For example, when a molded rubber article is removed from the mold and cooled to room temperature, the dimension of the article decreases as a result of thermal contraction and cure shrinkage. The difference between the dimensions of the article and the mold cavity in which it was molded is known as mold shrinkage. The mold must be designed to compensate for this characteristic. Mold shrinkage is generally minimized by curing at lower temperatures and varies with the type of rubber. For example, neoprene, nitrile and EPDM have relatively low shrinkage characteristics, while silicone can shrink about 3%.

A related phenomenon is that rubber tends to exhibit thermal expansion during exposure to elevated temperatures such as those associated with wheel curing operations. This phenomenon is substantially compensated by use of a sliding fit for supports such as support 130 adapted to engage the internal surface or hole 126 of a green wheel. In this manner, thermal expansion of the support during curing of the wheel tends to tighten the fit, nominally without exceeding the neutral support threshold.

Other supports, such as supports 30 and 230 adapted to engage peripheral surfaces, may be provided with relatively tighter interference fits. In this regard, the fixtures will continue to adequately support the wheel surface even after any loosening of the fit due to thermal expansion. The resiliency of rubber, as indicated in part by its durometer hardness designation, tends to facilitate installation of the support at interference clearances.

Although the subject invention has been shown and described for use with organic bonded abrasive grinding wheels, the invention may be utilized in various additional applications, including but not limited to fabrication of foundry cores, cold molded and heat cured electrical fixtures, heat cured epoxy parts, or any other polymer matrix object requiring support during an elevated temperature cure, e.g., up to about 350° C., preferably about 100–300° C.

Advantageously, the present invention provides a reusable support to reduce or eliminate the need for paper or sand beds during curing operations. The invention also effectively frees up molds during curing to enable greater mold utilization relative to in-mold curing techniques. The present invention also tends to reduce complexity of the mold relative to prior art devices that utilize additional componentry such as liners. Further, the present invention substantially reduces tolerance concerns associated with the fabrication and wear of rigid liners and mold components. The invention also surprisingly enables use of relatively low abrasion and tear resistant materials.

The foregoing description is intended primarily for purposes of illustration. Although the invention has been shown and described with respect to an exemplary embodiment thereof, it should be understood by those skilled in the art that the foregoing and various other changes, omissions, and additions in the form and detail thereof may be made therein without departing from the spirit and scope of the invention.

EXAMPLES

Examples of a frusto-conical support 30 have been fabricated from silicone rubber having a durometer hardness ranging from approximately 25–55 (Shore A). Wall thickness t was approximately ⅛ inch (0.12 cm) with a minimum inner diameter d1 of approximately 4.7 inches (11.9 cm) and a maximum inner diameter d2 of approximately 6 inches (15 cm). The silicone rubber survived 6 thermal curing cycles with temperatures up to 175° C. over 25 hours nominally without any permanent deformation.

Examples of support 130 had an outside diameter d3 of approximately 6 inches (15 cm), a height h' of approximately 3.25 inches (8.3 cm) and a wall thickness of approximately 0.25 inches (0.6 cm). These supports were successfully tested with green wheels having a cylindrical hole diameter of 6 inches (15 cm) and a thickness h' of approximately 3.25 inches (8.3 cm). These supports were fabricated from silicone rubber having durometer hardnesses of 30 and 50 (Shore A), respectively.

An example of a support 230 includes a diameter d2' of 2.516 inches (6.4 cm) and a wall thickness t" of 0.25 inches (0.6 cm) fabricated from silicone rubber, for use on a Type 18R wheel having a maximum nominal diameter of 2.5 inches (6.3 cm).

Having thus described the invention, what is claimed is:

1. A fixture for use in thermally curing a bonded abrasive grinding wheel outside of a mold used for molding the wheel, the wheel having a substantially cylindrical peripheral surface and being fabricated from a polymeric matrix and abrasive grain, the fixture comprising:

a wall portion of predetermined size and shape adapted for mechanically neutral supportive engagement with a surface of the wheel; the wall portion being adapted to maintain said supportive engagement during exposure to a range of temperatures of about 60 to 300° C. utilized for thermal curing of the wheel; and the wall portion being fabricated from a polymeric material being elastically deformable to facilitate the supportive engagement;

wherein the wall portion of the fixture is adapted to engage an interior surface of the wheel without engaging an exterior surface of the wheel.

2. The fixture as set forth in claim 1, wherein the interior surface and the fixture are substantially cylindrical.

3. The fixture as set forth in claim 2, wherein the fixture comprises a tube.

4. The fixture as set forth in claim 2, wherein the fixture comprises a solid plug.

* * * * *